United States Patent [19]
Eggendorfer

[11] Patent Number: 5,933,310
[45] Date of Patent: Aug. 3, 1999

[54] CIRCUIT BREAKER WITH WIDE OPERATIONAL CURRENT RANGE

[75] Inventor: Andreas J. Eggendorfer, Goleta, Calif.

[73] Assignee: Alan Scientific Corporation, Goleta, Calif.

[21] Appl. No.: 09/074,049

[22] Filed: May 7, 1998

[51] Int. Cl.$^6$ ........................................ H02H 5/04
[52] U.S. Cl. ............................................ 361/104; 337/76
[58] Field of Search ................... 361/56, 58, 104, 361/106, 111, 119, 126, 127; 337/14–16, 76, 28, 31, 32, 27

[56] References Cited

U.S. PATENT DOCUMENTS

| | | | |
|---|---|---|---|
| 5,198,791 | 3/1993 | Shibayama et al. | 337/31 |
| 5,200,875 | 4/1993 | Yoshioka et al. | 361/56 |
| 5,276,422 | 1/1994 | Ikeda et al. | 337/28 |

*Primary Examiner*—Ronald W. Leja
*Attorney, Agent, or Firm*—Elliott N. Kramsky

[57] ABSTRACT

A breaker circuit for disconnecting a surge arrestor is operable over a wide range of current values. A spring-tensioned conductor connects a first potential to a first terminal of the arrestor while a second terminal of the arrestor communicates with a second potential. The conductor is fuse-like and of predetermined current carrying capacity. The end of the conductor is connected to the first terminal by a solder bead of predetermined thermally-dependent strength. At low current values $I^2R$ heating of the arrestor gradually weakens the solder bond to the first terminal, making it subject to disconnection by spring-induced tension force. At high current values, the conductor vaporizes to provide the rapid disconnect required to avoid explosion and/or fire.

6 Claims, 2 Drawing Sheets

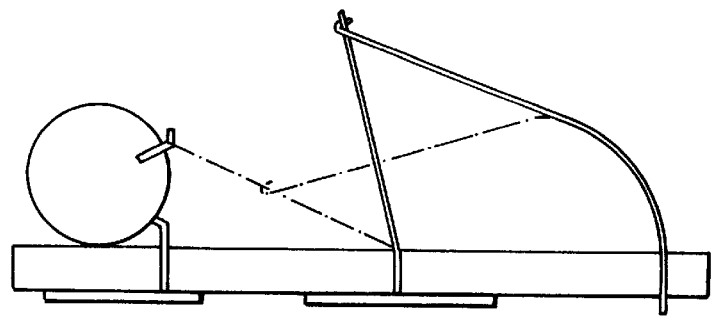
F I G. 2(a)
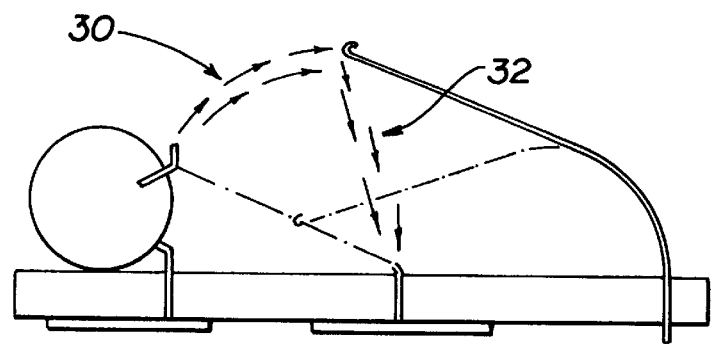
F I G. 2(b)
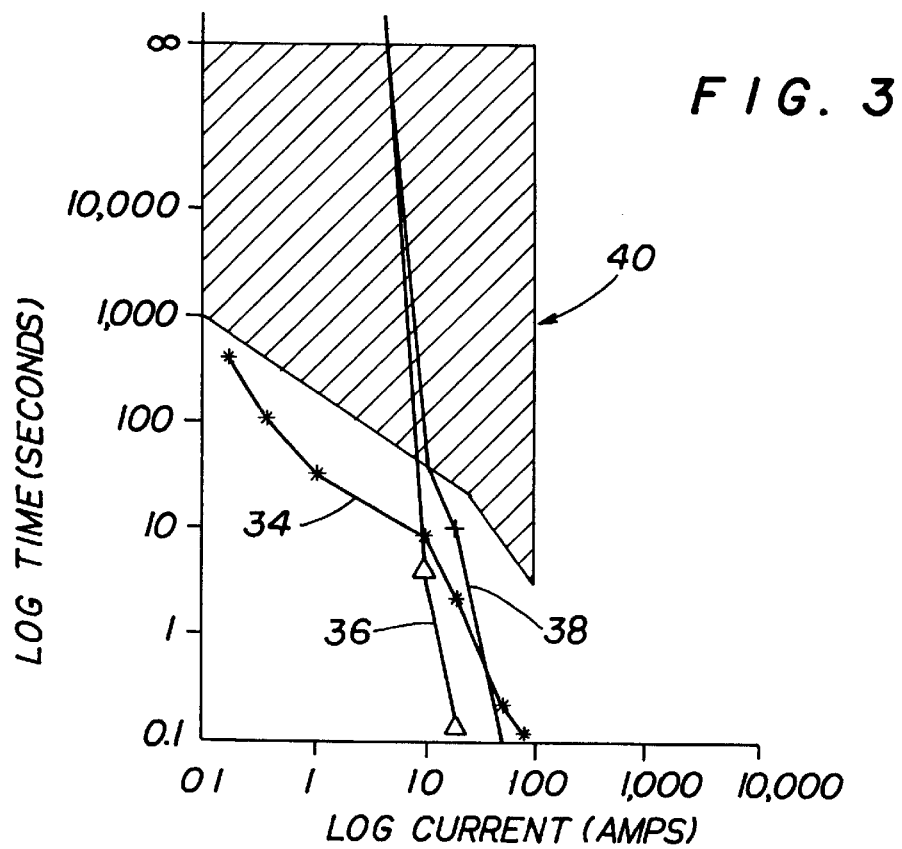
F I G. 3

CIRCUIT BREAKER WITH WIDE OPERATIONAL CURRENT RANGE

BACKGROUND

1. Field of the Invention

The present invention relates to apparatus for preventing electrical fires and explosions caused by the degeneration of surge protectors. More particularly, this invention pertains to a breaker circuit for a surge arrestor that is operable over a wide range of (a.c. or d.c.) power levels.

2. Description of the Prior Art

Surge arrestors are commonly employed to protect domestic electric devices, particularly on overhead supply lines leading to individual buildings, from transient or persistent overvoltages. Arrestor devices are also employed in houses supplied by underground cable as voltage surges can also occur in supply systems limited to underground cables as in those using a combination of underground cables and overhead lines. Such devices are additionally employed to protect individual electrical devices that are particularly sensitive to overvoltages.

Surge arrestors act to limit the intensity of transient or persistent overvoltages. Low voltage arrestors employed in office buildings that have electrical installations, hospitals, lighting towers and installations protected by circuit breakers prevent the undesired switching of such breakers which could otherwise be triggered by substantial overvoltages.

Surge or lightning arrestors may employ a number of devices including voltage-dependent resistors such as silicon carbide or metal oxide (MOV) varistors, silicon avalanche diodes (SAD's) and gas tubes comprising mixtures of argon and helium or other inert gas within a sealed ceramic insulating tube. Such devices act somewhat in the manner of a Zener diode, with resistance to current flow decreasing as voltage increases to limit the maximum potential difference. At very high overvoltages, large current flow through the device bleeds the voltage peak levels on the line conductor to protect the connected electrical devices, with the surge arrestor device (either alone or a parallel combination thereof) thereby acting as a voltage clamp.

Over time, such large flows of current will physically degrade the arrestor. Each time a surge occurs, some damage will take place, increasing the leakage current of the device relative to a given voltage change. After an accumulation of damage over time, excessive device leakage currents will generate enough $I^2R$ heating to burn a hole in the device. The "end of life" of an arrestor device means it will short circuit and draw excessive current until an interruption takes place or the device explodes, burns wires and causes fires.

Catastrophic failure of a surge arrestor can be quite dangerous, producing both fires and explosions. Accordingly, attempts have been made to remove or disconnect the surge arrestor from the line conductor before the end of its useful life. Generally, such efforts have relied upon the insertion of a fuse in series with the arrestor. Such a fuse will "blow" to disconnect the device from the a.c. or d.c. circuit by sensing the amount of current being drawn.

A significant drawback of fused arrangements lies in coordination of fuse action and response with failure of the surge arrestor device. During certain events, such as thunderstorms, very large voltage transients may appear upon the line conductor. Such transients can induce large current flows that are of sufficient strength to cause the fuse to blow. However, the surge capacity of a fuse is not a direct measure of the integrity of the physical status of the surge arrestor which, as mentioned, is a function of time in the sense that damage to its current-handling capacity is cumulative. Thus, a fuse might blow despite the arrestor's ability to handle many more episodes of overvoltage. In the case of a thunderstorm, which may last many hours, electrical devices can be left unprotected against overvoltage damage for hours by a fuse's blowing as a result of a current surge occurring relatively early. Thus fuse arrangements face the inherent design contradiction posed by the need for assured activation by a low resistance short while attaining sufficient current handling capacity to prevent premature surge arrestor disconnection.

U.S. Pat. No. 5,227,944 of Andreas J. Eggendorfer for "Breaker For Surge Protector", property of the assignee herein, teaches a device that is not subject to the shortcomings of fused arrangements. Rather that relying upon the current carrying capacity of a fuse, the disclosed device operates directly in response to the physical condition of a voltage dependent resistor surge arrestor. This is accomplished by housing the varistor within an airtight housing that includes a hinged panel. An arm fixed to the hinged panel engages a mechanism which, when activated by the escape of gases from the rapidly vaporizing varistor (a varistor takes less than one second to explode in such a situation), quickly opens the circuit that connects the line conductor to ground to thereby avoid fire or explosion.

While the above-described breaker device provides a device that overcomes the shortcomings of fused arrangements, recently-issued specifications of Underwriters' Laboratories (UL 1449—"Transient Voltage Surge Suppressors, Second Edition" (1998)) have added performance requirements that cannot be addressed by the above-described device. The new UL specification requires that a breaker be capable of disconnecting a surge arrestor over a very wide range of a.c. power line currents (250 milliamps to 10,000 amperes). Currents at the lower end of the mandated spectrum will only cause a varistor (or other common surge arrestor device such as a gas tube or SAI) to overheat to a sufficient extent without activating the breaker mechanism while those at the upper end of the range can cause vaporization to take place within a fraction of a second. While the device is perfectly adequate to actuate and break the circuit prior to a fire or explosion at the upper end of the range the device will not trigger at the lower end as the $I^2R$ heating internal to the damaged varistor will not produce the explosive disintegration of the device required to generate sufficient pressure within the airtight housing to move the panel about the hinge to actuate the breaker mechanism. Rather continuing $I^2R$ heating may lead to significant heating of the housing that can produce fire in adjacent structures.

SUMMARY OF THE INVENTION

The foregoing and other disadvantages of the prior art are addressed by the present invention that provides a circuit for selectively interrupting the flow of current between a first potential and a second potential. Such circuit includes an insulative substrate. A surge arrestor fixed to the substrate has a first terminal for communicating with the first potential and a second terminal for communicating with the second potential. One end of a conductor is fixed to the substrate and in communication with the first potential and the other end is connected to the first terminal of the arrestor. The conductor is of predetermined current carrying capacity and the end is connected to the surge arrestor by means of material of predetermined thermally-dependent strength. Means are provided for exerting tension upon the conductor.

BRIEF DESCRIPTION OF THE DRAWINGS

FIGS. 2(a) and 2(b) illustrate the operation of the invention in the presence of low and high line currents respectively; and FIG. 3 is a graph for illustrating the relative failure modes of surge arrestors protected by fused arrangements and the invention.

DETAILED DESCRIPTION OF THE PREFERRED EMBODIMENT

Figure 1A:
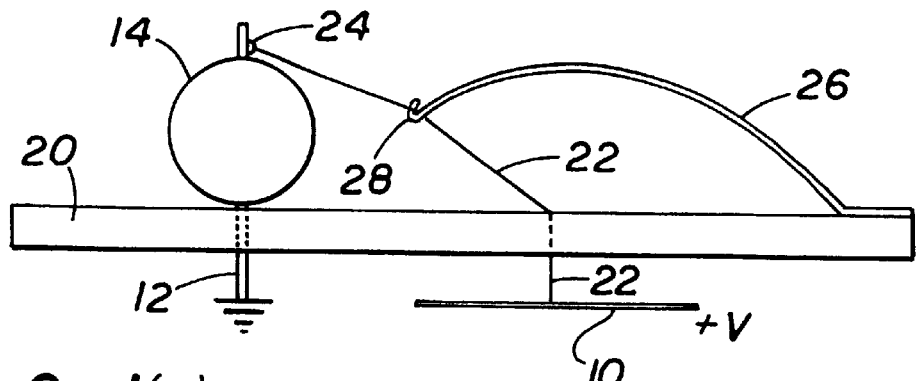
FIGS. 1(a), 1(b) and 1(c) are side elevation views of the invention in three alternative embodiments.
Figure 1B:
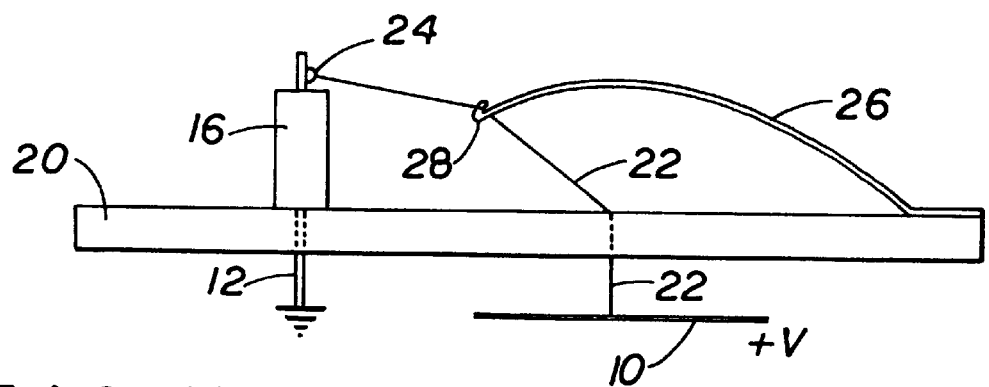
Figure 1C:
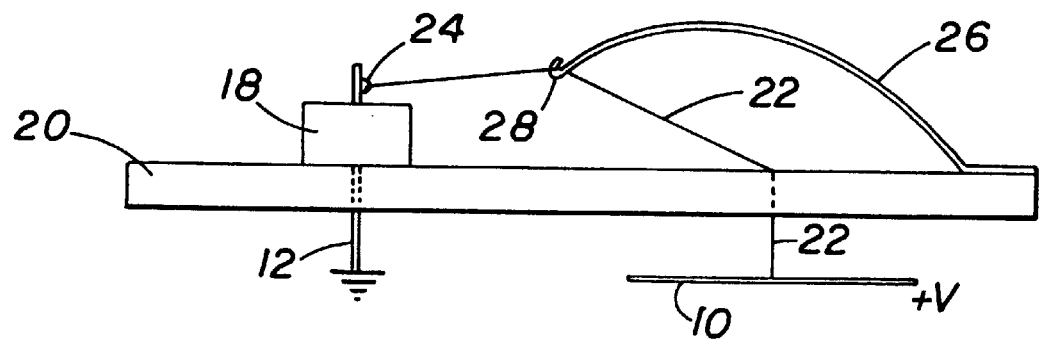

Turning now to the drawings, FIGS. 1(a), 1(b) and 1(c) are side elevation views of alternative embodiments of the present invention. The discussion of the figures will precede with like elements of the alternative embodiments indicated by corresponding numerals.

The invention pertains to an electromechanical arrangement for appropriately disconnecting a surge arrestor that lies within a circuit connecting a line (or high a.c.) conductor 10 and a ground (or low a.c.) conductor 12. The surge arrestor 14 is shown in FIG. 1(a) to be a voltage dependent resistor or varistor. Alternative embodiments of the invention vary essentially only insofar as the element employed as the surge arrestor. In FIG. 1(b), the surge arrestor comprises a silicon avalanche diode 16 (SAD), whereas, in FIG. 1(c), it comprises a gas tube 18 as described supra. Each of the surge arrestor devices includes one terminal appropriate for electrical connection to the line conductor 10 and another terminal for connection to the ground conductor 12. A supporting substrate 20 of insulative material is provided. The discussion of the invention will proceed with primary reference to the embodiment of FIG. 1(a), it being understood that the general arrangement and operation of the embodiments of FIGS. 1(b) and 1(c) correspond to that described with reference to FIG. 1(a).

A conductor 22 provides an electrical path between the line conductor 10 and the surge arrestor 14. The conductor 22 is of appropriate composition (e.g. copper, silver or the like), properties and dimensions so that it will rapidly vaporize when subjected to the passage of a current of predetermined magnitude while remaining intact when subjected to currents below such predetermined magnitude.

One end of the conductor 22 is in communication with the line conductor 10. The other end of the conductor 22 is connected (without being wrapped around) to the appropriate terminal of the varistor 14 by means of a solder bead 24. The solder bead 24 is of appropriate thermal properties chosen in conjunction both with the operational current range of the circuit and the current-carrying capacity of the conductor 22. A spring 26 has one end anchored to the support substrate 20 and the opposed free end 28 formed as a hook for engaging the conductor 22. The spring 26 is of appropriate spring steel or like material (or, alternatively, in the form of a coiled spring) for exerting a tensioning force upon the conductor 22.

In operation, the invention provides distinct modes for breaking the circuit between conductor 10 and the ground conductor 12 prior to, and triggered by the imminence of, catastrophic failure of the surge arrestor varistor 14. (Note: The breaking of the circuit may be arranged to take place at either the high end of the circuit—as shown—or at the low end in accordance with the invention.) Each of such modes detects and is responsive to the existing physical condition of the surge arrestor, unlike devices that rely entirely upon a disintegrating fuse. Furthermore, the breaker of the invention is effective over a very wide range of electrical currents.

The alternative modes of operation of the invention are disclosed in FIGS. 2(a) and 2(b). In each of these figures, the non-triggered configuration of the breaker is shown in shadow outline. FIG. 2(a) illustrates the thermal disconnect mode of the invention that occurs at the lower end of the UL current range. In this mode, the conductor 22 remains intact as its current-carrying capacity is not exceeded. Disconnection of the varistor 14 from the conductor 22, and consequent breaking of the circuit between the line conductor 10 and the ground conductor 12, results from the gradual melting of the solder bead 24 in response to $I^2R$ heating of the varistor coupled with the tensioning of the conductor 22 by the spring 26. Appreciable $I^2R$ heating of the varistor 14 only takes place in the presence of significant leakage current. The degree of leakage current indicates the extent of high voltage surge damage accumulation occasioned over time. Due to the low level of power on the line conductor 10, the varistor 14 will not explode prior to the time that $I^2R$ heating, in combination with spring tension force, disconnects the varistor 14. Similar modes of operation are associated with both silicon avalanche diodes and gas tubes and thus circuits in accordance with the invention that employ such alternative surge arrestor devices undergo a like disconnection mode in the presence of a low power line 10. Since the spring 26 does not lie within the current path, it will not heat up and therefore spring tension does not diminish or weaken.

The above-described process, appropriate for handling low power, may be inadequate for safe disconnection when handling larger currents due to the rapidity with which the varistor 14 degrades in the presence of very large currents. While the extent of degradation of the varistor 14 may be the same at the initiation of breakdown, the duration of such process in a high power system can be rapid to cause an explosion and fire.

FIG. 2(b) illustrates the circuit breaking process of the invention in the presence of a high power supply. In this case, disconnection results from rapid vaporization of the conductor 22. Unlike the process illustrated in FIG. 2(a) for low power operation, at high current, disconnection results from the conductor 22 acting essentially as a fuse. A degraded varistor 14 will experience an abrupt, significant and near-instantaneous increase in leakage current that will rapidly lead to explosion. As the leakage current passes through a conductor 22 whose composition and size have been preselected to provide a current-handling capacity that lies at the low end of a range of leakage currents indicative of near-instantaneous breakdown and explosion of the varistor 14, disconnection of the dangerous surge arrestor occurs as in the case of a fused device. As shown in FIG. 2(b), the hooked end of the spring 26, released by vaporization of the wire 22, moves away from proximity to the varistor 14, effectively stretching the unavoidable high power arc between the power source and the varistor 14 and creating the two arc sections 30 and 32. By stretching the arc, the spring 26 thereby facilitates its extinction, further reducing the likelihood of fire. As before, the gas tube and silicon avalanche diode devices described above operate similarly in principle to the varistor 14 throughout the UL current range and, thus, will experience the low power and high power disconnection modes of both FIGS. 2(a) and 2(b). The appropriate length, composition and physical properties of the conductor 22 may vary in accordance with the type of surge arrestor employed.

FIG. 3 is a graph that illustrates the relative failure modes of surge arrestors protected by fused arrangements and by the invention. The curve 34 plots (in logarithmic scale) the time required for disconnecting the surge arrestor in accordance with the invention. A curve 36 plots the disconnect characteristic of a commercially available 6 ampere fuse (fast acting) while the curve 38 plots the characteristic for a similar 6 ampere fuse with time delay. The shaded region 40 represents the area of fire hazard or castrophic explosion. That is, for a given current level, one may expect fire or explosion to occur unless disconnection is accomplished at a value below the region 40.

It can be noted that the lower (time) boundary of the region 40 decreases with increasing current. Curve 34, which plots the operation of the invention, undergoes a decrease in disconnect time as current is increased. Further, such curve is characterized by an abrupt decrease in disconnect time at approximately 10 amperes, reflecting the fact that disconnection is accomplished at lower currents by the relatively-slow heating of the solder bead 24 to liquidus, whereas, at the higher current levels, the much faster fuse-like vaporization of the conductor 22 is the source of disconnection.

In contrast to Applicants's invention whose operation remains below the fire hazard region 40, one may observe that, for both a six ampere fast fuse and a six ampere time delay fuse, excessive time is required to disconnect the surge arrestor when the supply current is no more than 10 amperes while the device of U.S. Pat. No. 5,227,944 is inadequate at low current values that fail to produce the explosive disintegration of the arrestor required to trigger the circuit breaker mechanism. As mentioned earlier, current UL standards demand adequate performance over a very broad range of current values. Thus, the arrangements of the prior art are clearly inadequate whereas Applicant's invention discloses a satisfactory solution.

Thus it is seen that the present invention provides a practical apparatus for satisfying the stringent new UL standards. By employing an arrangement in accordance with the invention, one may be assured that the surge arrestor will be disconnected from a power line in a timely fashion regardless of current level.

While this invention has been described with reference to its presently preferred embodiment, it is not limited thereto. Rather, this invention is limited only insofar as it is defined by the following set of patent claims and includes within its scope all equivalents thereof.

What is claimed is:

1. A circuit for selectively interrupting a flow of current comprising, in combination:
   a) an insulative planar substrate having first and second electrical contacts in spaced relation;
   b) a surge arrestor fixed to said substrate and having a first terminal and a second terminal in communication with said first electrical contact;
   c) a conductor, one end of said conductor being directly connected to said second electrical contact and the other end being connected to said first terminal of said arrestor whereby there exists a path of current flow through said conductor and said arrestor between said first and second electrical contacts;
   d) said conductor being of predetermined current carrying capacity;
   e) said end of said conductor being fixed to said first terminal by solder of predetermined thermally-responsive strength; and
   f) an elongated spring of resilient metallic composition fixed to said substrate at one end and engaged to said conductor at the opposed end for exerting tension upon said conductor whereby said current path does not include said spring.

2. A circuit as defined in claim 1 wherein said opposed end of said spring includes a hook for engaging said conductor.

3. A circuit as defined in claim 1 wherein said surge arrestor is a varistor.

4. A circuit as defined in claim 1 wherein said surge arrestor is a silicon avalanche diode.

5. A circuit as defined in claim 1 wherein said surge arrestor is a gas tube.

6. A circuit as defined in claim 1 wherein said spring is substantially straight and assumes a generally-accurate shape when engaged to said conductor.

\* \* \* \* \*